United States Patent [19]

Yamaguchi et al.

[11] 4,114,069

[45] Sep. 12, 1978

[54] METHOD AND APPARATUS FOR DRIVING A GAS-DISCHARGE DISPLAY PANEL

[75] Inventors: Hisashi Yamaguchi, Kakogawa; Seii Sato, Kobe; Toshiaki Iemori, Kakogawa; Shizuo Andoh, Kobe, all of Japan

[73] Assignee: Fujitsu Limited, Kawasaki, Japan

[21] Appl. No.: 767,690

[22] Filed: Feb. 11, 1977

Related U.S. Application Data

[63] Continuation-in-part of Ser. No. 594,547, Jul. 9, 1975, abandoned.

[51] Int. Cl.[2] ........................ H05B 41/14; G06F 3/14

[52] U.S. Cl. ........................ 315/169 TV; 340/324 M; 340/168 S

[58] Field of Search .................... 315/169 TV, 169 R; 340/324 M, 168 S, 166 EL

[56] References Cited

U.S. PATENT DOCUMENTS

| | | | |
|---|---|---|---|
| 3,795,908 | 3/1974 | McDowell et al. | 340/324 M |
| 3,911,422 | 10/1975 | McDowell et al. | 340/324 M |
| 3,925,703 | 12/1975 | Schermerhorn | 315/169 TV |

*Primary Examiner*—Eugene R. LaRoche
*Attorney, Agent, or Firm*—Staas & Halsey

[57] ABSTRACT

An improved method and apparatus to shift discharge spots produced in a gas discharge display panel, in accordance with given input information so that said discharge spots may be display-held in a desired display position. The shift operation is performed by supplying shift voltages sequentially to shift electrodes. A feature of this invention is to oscillate the discharge spots while they are being display-held in a display position, by supplying an operating voltage alternately to adjacent two shift electrodes during a display period. By oscillating the discharge spots during the display period, an operation margin is obtained which is equivalent to the operation margin available during the shift period, and operation of said display panel can be stabilized to avoid misfiring.

6 Claims, 6 Drawing Figures

METHOD AND APPARATUS FOR DRIVING A GAS-DISCHARGE DISPLAY PANEL

CROSS-REFERENCE TO RELATED APPLICATION

This application is a continuation-in-part of Ser. No. 594,547 filed July 9, 1975, now abandoned.

SUMMARY OF THE INVENTION

This invention relates to an improved method and apparatus for driving a gas discharge display panel, in particular to a self-shift driving circuit for a gas discharge panel operating to sequentially shift discharge spots produced in selected gas discharge spaces, which are selected according to given input information.

An object of this invention is to provide an improved method and apparatus for driving gas discharge display panels, wherein discharge spots are shifted, providing improved display characteristics.

Another object of this invention is to provide a self-shift drive method and apparatus which will give a substantially equal "operation margin" to both the shift operation and the display operation.

A further object of the invention is to provide a self-shift drive method and apparatus which will protect the display from misfiring and provide a stable, high quality display.

In principle, a feature of this invention is to alternately supply an operating voltage followed by an erase voltage, during the display period, to two groups of electrodes which will display-hold the discharge spots for the required display. With this feature, a substantially equal "operation margin" can be given to both the display operation and the shift operation.

Other objects and features of the invention will be better understood from the following description taken in connection with the accompanying drawings.

DESCRIPTION OF THE PREFERRED EMBODIMENTS

In a gas discharge display panel, also known as a plasma display panel, discharge spots are produced in response to input information and are sequentially shifted until a desired position is reached. Then, the shift operation is stopped and the panel is switched to a display operation. A conventional method of self-shift operation is described, for example, on pages 38 and 39 of Digest papers, 1972 International Symposium of Society for Information Display, entitled "Self-Shift Plasma Display", by S. Umeda et al. The operation of a conventional self-shift operation will be described by referring to FIGS. 1(A) and 1(B) which illustrate the structure of a gas discharge panel, as well as improved circuitry.

Figure 1A:
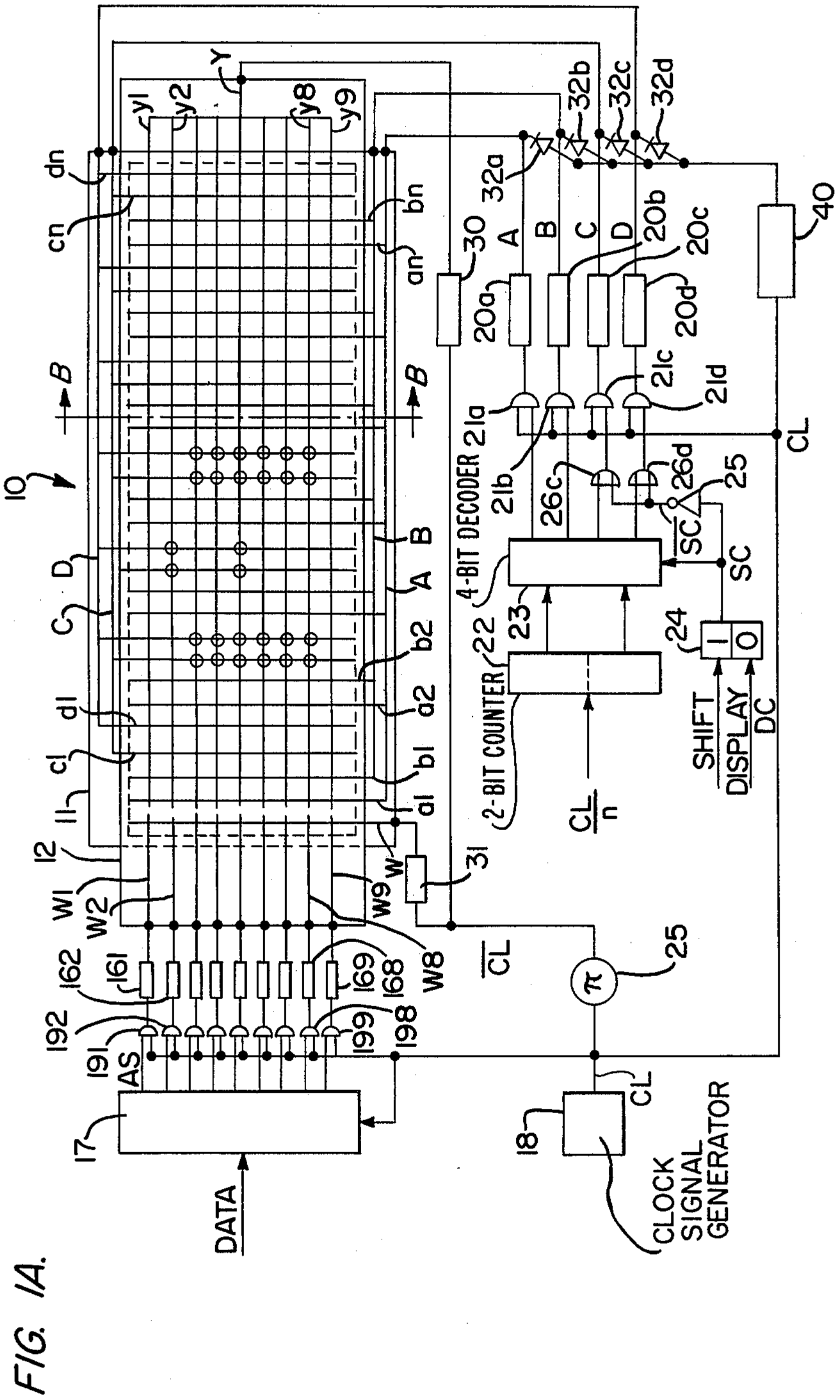
FIG. 1(A) illustrates a gas discharge display panel and a circuit configuration for self-shift driving the panel.
Figure 1B:
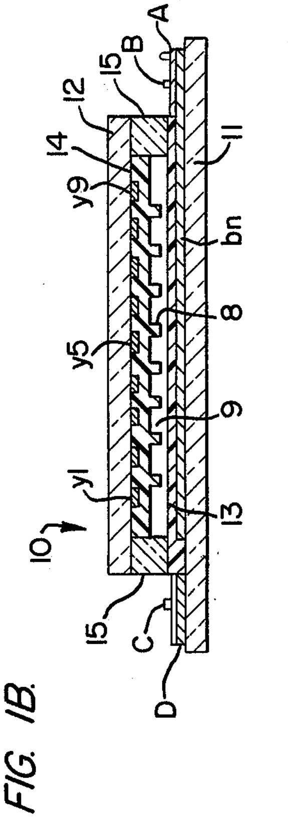
FIG. 1(B) is a sectional view showing the structure of the gas discharge panel in FIG. 1(A).

FIG. 1(A) illustrates a conventional self-shift gas discharge panel and improved circuitry used for driving that panel. FIG. 1(B) shows a B—B cross-section of the panel illustrated in FIG. 1(A). In FIGS. 1(A) and 1(B), the gas discharge panel 10 is shown to include a pair of parallel glass boards 11 and 12; at least one of which is transparent. Glass board 11 has a number of shift electrodes *a*1, *b*1, *c*1, *d*1, *a*2, . . . , *an, bn, cn,* and *dn* disposed thereon and arranged in parallel to each other. A common "write" electrode W is provided in parallel to the shift electrodes and adjacent the shift electrode *a*1. On the facing surface of the glass board 12, common parallel electrodes *y*1, *y*2, . . . , *y*9 and "write" electrodes W1, W2, . . . , W9 are provided. The common parallel electrodes correspond to the respective "write" electrodes, but are electrically insulated therefrom. The common parallel electrodes extend in directions which define intersecting points with respect to the shift electrodes *a*1, *b*1, *c*1, *d*1, . . . , *an, bn, cn, dn,* and the "write" electrodes W1, W2, . . . , W9 define intersecting points with respect to common "write" electrode W. In the above described panel, the common "write" electrode W is disposed on the glass board 11 with the shift electrodes, and the "write" electrodes W1–W9 are disposed on the glass board 12 with the common parallel electrodes *y*1–*y*9. However, it is clear that the location of the "write" electrodes W and W1–W9 could be reversed with respect to the shift and common parallel electrodes.

The shift electrodes and the common "write" electrode on glass board 11 are surface-coated with a dielectric layer 13. The common electrodes and the "write" electrodes on glass board 12 are coated with a dielectric layer 14. Dielectric layers 13 and 14 are made of low melting point glass. A barrier 8, made of the same dielectric material, is formed on dielectric layer 14, and provides shift channels to discharge spots. The two boards are hermetically sealed with sealing material 15, and the resulting space between the boards is filled with an ionizable gas.

Bus bars A, B, C and D are formed on the outer extension of board 11, and said shift electrodes *a*1, *b*1, *c*1, *d*1, . . . , *an, bn, cn* and *dn* are correspondingly connected to said bus bars. An extension of the board 12 is provided with a common bus Y and electrodes *y*1, *y*2, . . . , *y*9 are connected thereto.

The "write" drivers 161, 162, . . . , 169 are correspondingly connected to "write" electrodes W1, W2, . . . , W9 and said "write" drivers are selectively driven by an output signal from AND gates 191, 192, . . . , 199. The AND gates 191, 192, . . . , 199 receive respective "write" information from the address decoder 17 and the clock signal CL from the clock signal generator 18.

Shift drivers 20*a*, 20*b*, 20*c* and 20*d* are connected to said shift bus bars A, B, C and D respectively, and each shift driver 20*a*, 20*b*, 20*c* and 20*d* respectively, receives its input signal from an AND gate 21*a*, 21*b*, 21*c* and 21*d*. The shift drivers are sequentially driven as a result of the output of their respective AND gates which receive the timing clock signal CL and shift signals which are decoded by the output from the 2-bit counter 22, through 4-bit decoder 23. Drivers 30 and 31 are respectively connected to the common bus Y and the common "write" electrode W. These drivers 30 and 31 are driven by $\pi$-phase shifter 25 which shifts the phase of the clock signal CL by 180°, to CL.

Erase driver 40 receives the clock signal CL and supplies the erase voltage V*e* to coupling diodes 32*a*, 32*b*, 32*c* and 32*d* respectively connected to shift bus bars A, B, C and D.

In actual operation, "write" drivers 161, 162, . . . , 169 are selectively energized by "write" information AS supplied from address decoder 17. Intersections of selected "write" electrodes W1 to W9 and the common "write" electrode W are supplied with a "write" voltage having an amplitude which exceeds the ordinary firing voltage V*f*. As a result, discharge spots are produced in response to the "write" information for a line information presentation. A shift voltage V*sh* is supplied to the selected shift electrodes and has its amplitude set lower than ordinary firing voltage V*f* but higher than actual firing voltage $Vf_1$. Actual firing voltage $Vf_1$ is lower than the ordinary firing voltage V*f* and is effective to cause discharge at a selected spot when a discharge spot is produced at an adjacent discharging point, by the primary current effect therefrom. The shift voltage V*sh* is first applied to shift bus A from shift driver 20*a* and the selected discharge spots produced on discharging points along the "write" common bus W are shifted to corresponding points on the first shift electrode *a*1, which is connected to bus A. Thereafter, the discharge spot is sequentially shifted in the direction along common electrodes *y*1 to *y*9, in the sequence of shift electrodes *b*1 -*c*1-*d*1, by sequentially driving shift drivers 20*b*, 20*c* and 20*d* by controlling gates 21*b*, 21*c* and 21*d* with the output of decoder 23, in response to the output of 2-bit counter 22. Erase voltage pulses V*e* are applied to the shift bus bars, which are not having a V*sh* applied thereto. Discharge spots which correspond to "write" information AS for the next line of information, are produced by selectively driving the "write" drivers 161, 162, . . . , 169 again, when decoder 23 has completed the output of signals for all shift phases, A to D.

As shown in FIG. 1(A) discharge spots formed in response to a given "write" information are shifted rightward, and result in a space equivalent to 3 shift electrodes between horizontally adjacent spots.

In order to display the written data, according to a conventional method, the shift operation is temporarily stopped and a shift voltage is continuously supplied to only one of the bus bars. That technique results in a single width display which is of low quality since it has low intensity.

In the case of the improved circuitry shown in FIG. 1A, a shift command signal SC, which enables the output of decoder 23, is switched to a zero level during the display period by a flip-flop 24 to thereby disable the output of decoder 23. When the flip-flop 24 receives display command signal DC, the shift operation is temporarily stopped. Inverted output SC from inverter 25 simultaneously energizes shift drivers 20*c* and 20*d* which correspond to bus bars C and D, through OR gates 26*c* and 26*d* and AND gates 21*c* and 21*d* respectively. Therefore, in conjunction with the shift electrodes connected to bus bars C and D, a character such as "A" which corresponds to an example of given input "write" data shown by circles in FIG. 1(A), is displayed on panel 10.

The discharge spots for displaying are memorized in the form of a wall charge, well known in conventional plasma displays. The memorized display pattern is shifted when the shift operation is restarted.

Figure 2:
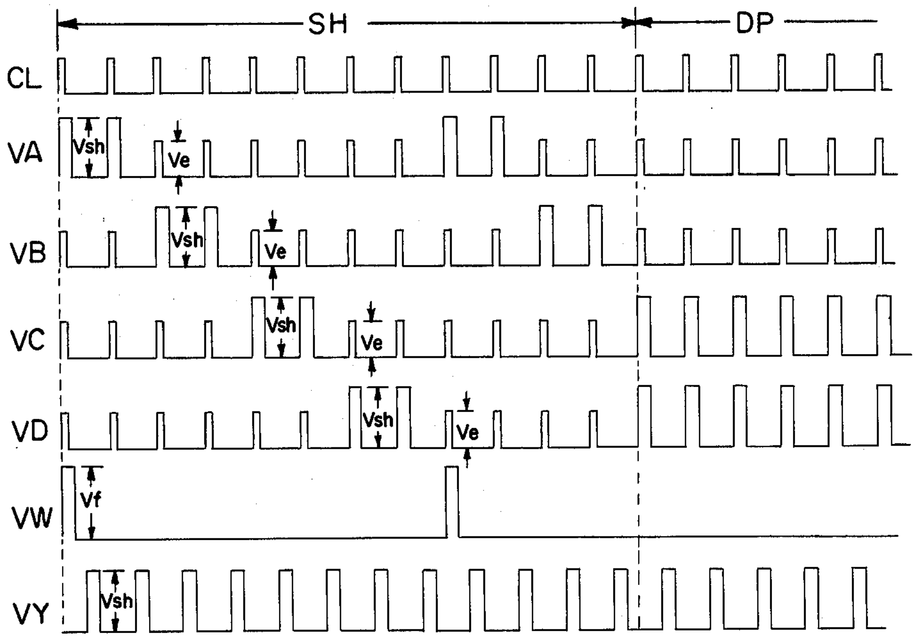
FIG. 2 shows waveforms used for self-shift operation of the circuit and panel in FIG. 1(A).

FIG. 2 illustrates voltage waveforms of the circuitry shown in FIG. 1A such voltage waveforms being supplied to the various bus bars and electrodes in panel 10 during the aforesaid shift operation and display operation. Voltages VA to VD are respectively applied to bus bars A to D, and voltage VW is supplied to "write" electrodes W1 to W9. Voltage VY is supplied to "write" common electrode W and common bus Y. The shift voltage pulse V*sh* is applied to the corresponding shift bus bar for two sequential clock pulses, followed by the application of an erasing voltage V*e*, which is lower in amplitude than the shift voltage pulse V*sh*. As shown in FIG. 2, discharge spots which correspond to addressed data points are shifted during the shift period SH, by shift voltage pulses V*sh*, which are sequentially applied to the shift bus bars A to D. Therefore, during the display period DP, discharge points on two immediately adjacent shift electrodes correspond to one addressed data point because voltage pulses are simultaneously supplied to two groups of electrodes through respective bus bars C and D.

The conventional method, as discussed earlier, displays characters by activating only a single group of electrodes connected to a single bus, thereby maintaining a space equivalent to three shift electrodes between the horizontally adjacent discharge spots forming the display pattern. However, such a conventional method results in a poor quality and low intensity display. For this reason, the display method, of the present invention described above, which simultaneously drives two groups of adjacent electrodes (shown in FIG. 1(A)), is seen as a distinct improvement. However, the use of this improved method described above has shown that the "operation margin" is lowered during the display operation as compared with that during the shift operation. By illustration, during a 4-phase shift operation a minimum 3-line space separation is ensured for horizontally adjacent discharge spots, one of which corresponds to a first data point and the other of which corresponds to a second data point. During the display period, the spacing between the horizontally adjacent discharge spots is reduced to 2 lines and coupling between two adjacent shift electrodes connected to a common bus is increased, thereby to increase the chances of inducing misfire. The term "operation margin" denotes the potential difference between the actual firing voltage $Vf1$, which is required to cause discharge at a discharge point when a discharge is occurring at an immediately adjacent discharging point, and the firing voltage $Vf5$, which is required to cause discharge at a discharge point when the next closest discharge is occurring at a corresponding discharge point of a corresponding shift electrode connected to the same bus but separated from each other by a cycle period (an operation cycle).

The firing voltages of discharge points related to 3 electrodes located between a discharge point being discharged and a discharge point to be fired next, are numbered $Vf2$, $Vf3$, and $Vf4$. In conjunction with ordinary firing voltage V*f*, these firing voltages have the following amplitude relation: $Vf > Vf1 > Vf2 > Vf3 > Vf4 > Vf5$. The term "operation margin at display" denotes the difference between $Vf1$ and $Vf4$.

Figure 3:
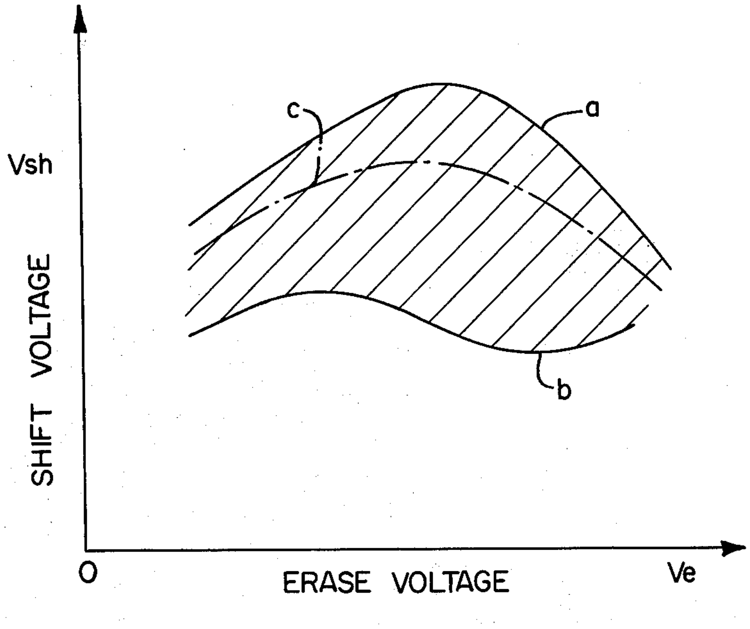
FIG. 3 is a graph of voltage plots used to describe the term "operation margin".

Referring, now, to FIG. 3, the relationship of these margins is shown with the shift voltage V*sh* plotted along the vertical axis and the erase voltage V*e* plotted along the horizontal axis. The "operation margin" during the shift operation is represented by a region between the curves designated *a* and *b*, and the margin during the display operation is shown by a region between curves designated *c* and *b*. The erase voltage, plotted along the horizontal axis, indicates the peak value of an erase pulse necessary to erase the wall charge for the preceeding discharge point before a shift voltage V*sh* is supplied. The amplitude of shift voltage V*sh* is then determined, with respect to the extent of erasing effected by the erase pulse, so that misfiring may be eliminated when the next shift pulse is supplied. As shown in FIG. 3, for example, if the shift pulse amplitude is set high enough to satisfy a requirement for high-speed shifting, and the discharge points are display-held during the display operation by a shift voltage of the same level, there is an increased possibility that misfiring (an uncommanded discharge) may occur at another corresponding discharge spot related by a common bus.

As indicated above, this invention provides display-holding of discharge spots wherein each addressed spot corresponds to a spot on each of a group of two adjacent electrodes. For example, an addressed discharge spot which is shifted during the shifting operation will be displayed on two adjacent discharge points on shift electrodes respectively connected to bus bars C and D, during the display operation. However, the problem of a fluctuating "operation margin", inherent in the display operation method, is solved in the following embodiment of the present invention by alternately supplying an operating voltage to each of the bus bars C and D connected to the respective groups of shift electrodes which display-hold the discharge spots.

Figure 4:
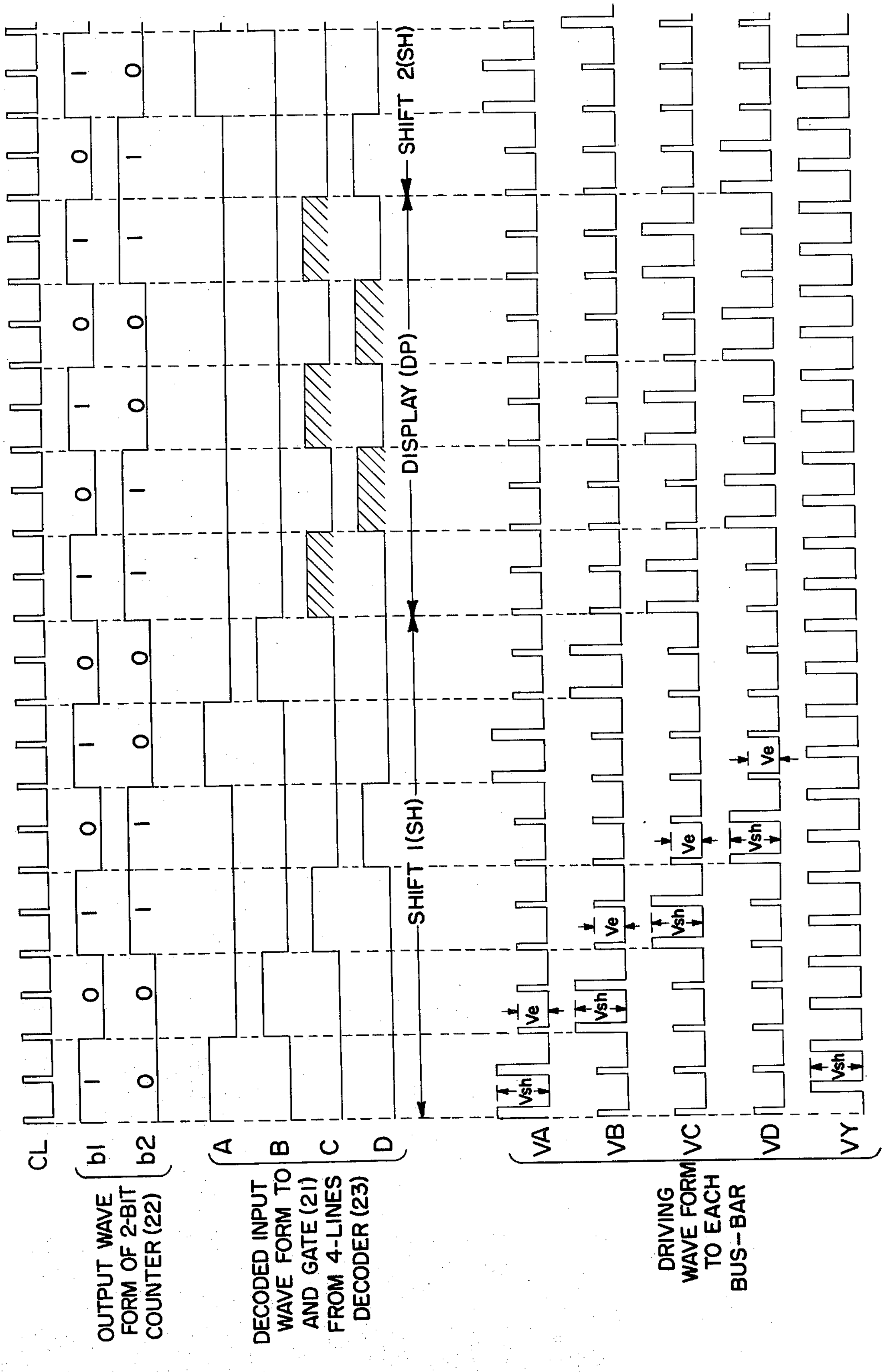
FIG. 4 is a voltage waveform diagram indicating an improved operation sequence for self-shift driving and display according to the present invention.

FIG. 4 shows the waveforms of voltages supplied to each electrode of a gas discharge panel which will attain the advantages of the subject invention. The shift voltages VA to VD are sequentially supplied to respective bus bars A to D during the shift operation period SH, similar to the case shown in FIG. 2. However, during the display period DP, voltages VC and VD are alternately supplied to bus bars C and D. Therefore, when shift operation is switched to display operation, the discharge spots shifted onto the shift electrode group connected to bus C are displayed. After a period of time equivalent to a single shift period has elapsed, a display operating voltage is supplied to bus D. The discharge spots are thereby shifted from the shift electrode group connected to bus C onto the shift electrode group connected to bus D and the discharge spots associated with bus C are erased. In repetition, the operating voltage is again supplied to bus C so that the discharge spots will return to electrodes in the group connected to bus C and the discharge spots associated with bus D are erased. This method of alternately applying a display operating voltage followed by an erase voltage is repeated for the remainder of the display operation period DP. In other words, characters are displayed by oscillating the discharge spots between the shift electrodes connected to bus C and the shift electrodes connected to bus D. During the display operation period DP, electrodes which simultaneously receive the display operating voltage are always spaced by 3 idling electrodes. In terms of "operation margin", the 3-electrode spacing is substantially equal to the condition during the shift period and, as a result, the "operation margin" during the display period can be increased up to the "operation margin" during the shift period.

Figure 5:
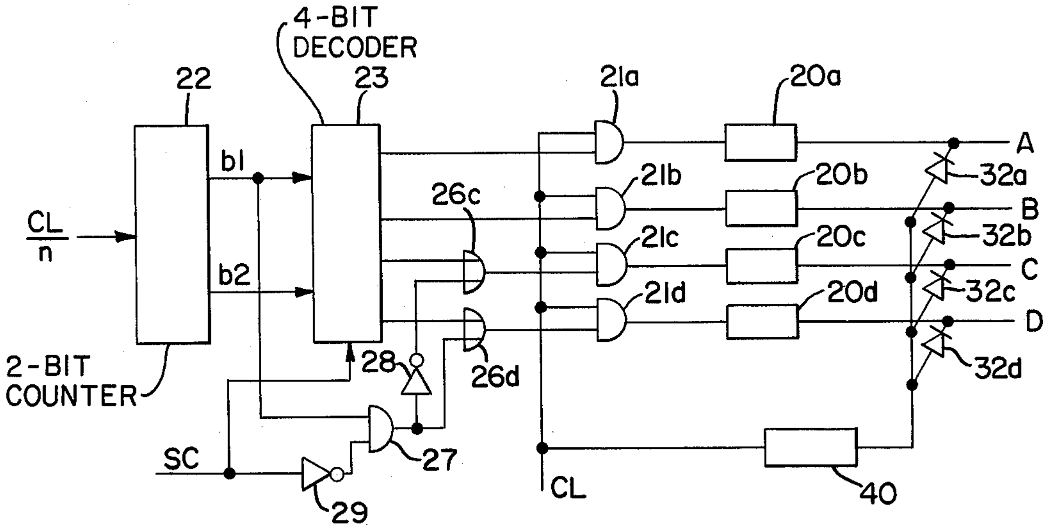
FIG. 5 shows an embodiment of the improved circuit configuration for obtaining improved self-shift operation of the present invention.

FIG. 5 shows a basic configuration of a circuit to oscillate the discharge spot during the display operation. OR gates 26c and 26d are connected to driver lines related to bus bars C and D and operate to display-hold shifted discharge spots during the display period. When the shift command signal goes to its "0" zero level, the output of the 4 line decoder 23 is inhibited. The inverter 29 enables AND gate 27 to gate through the first count output *b*1 of the 2-bit counter 22. The output signal from AND gate 27 is supplied to OR gate 26c through an inverter 28, and is supplied directly to the OR gate 26d as the first count output *b*1 of 2-bit counter 22. Therefore, during the time the shift command signal SC is held at its zero level, by the display command signal DC, drivers 20c and 20d, connected to bus bars C and D, are alternately driven by the first count output *b*1 of the 2-bit counter 22.

Since drivers 20c and 20d are effectively switched by the *b*1 output of 2-bit counter 22, the switching interval during the display operation can be set equal to the shifting interval of the shift operation, which can be easily set as fast as approximately 1.2msec to thereby eliminate the problem of a flickering display.

Although, the foregoing embodiment relates to a panel having four bus bars, this invention can be similarly applied to panels having at least 3 bus bars. In such a case, the discharge spots are oscillating between two or more electrodes.

In addition, to compose Y-direction electrodes *y*1 to *y*9 in units of an electrode, the Y-direction electrodes may be composed in units of 2 parallel electrodes so that shift operation may be controlled by making correspondence between two discharge spots located along shift electrodes and a single data point. In the latter case, four discharging points correspond to a single point, thereby making the display very dense. It is clear that discharge spots may be paired for oscillating during the display operation. Further, a pair of Y-direction conductors can be alternately driven so that discharge spots may be oscillating in a direction along shift electrodes. Such oscillation may be performed by adding a function which alternately drives adjacent Y-direction electrodes. Therefore, misfiring along the direction of the shift electrodes can also be prevented.

As is clear from the foregoing description, this invention makes it possible to display-hold discharge spots in a self-shift driving arrangement using two adjacent electrodes, thereby making the display dense and of high quality. In conjunction with the aforesaid display operation, discharge spots are oscillated between discharge points related to the two electrodes. Therefore, the display operation can be conducted under conditions substantially equal to those of the shift operation.

It will be apparent that many modifications and variations may be effected without departing from the scope of the novel concept of this invention. Therefore, it is intended by the appended claims to cover all such modifications and variations which fall within the true spirit and scope of the invention.

What is claimed is:

1. A method of driving a gas discharge display panel having a first base plate with a set of parallel common electrodes disposed thereon, a second base plate with a set of parallel shift electrodes disposed thereon, said set of parallel common electrodes being oriented to respectively traverse the set of parallel shift electrodes in intersecting fashion for defining a discharge region at each of the traversing intersections, a set of write electrodes disposed on said first and second base plates, said set of write electrodes corresponding to said set of parallel common electrodes and defining write discharge regions, and a discharge gas contained between said plates occupying said discharge regions, comprising the steps of:

(a) addressing selected ones of said set of write electrodes with a write voltage producing discharges at corresponding selected write discharge regions;

(b) applying a first shifting voltage pulse to a first shift electrode of said set of parallel shift electrodes immediately adjacent said selected write discharge regions thereby effecting a lateral shifting of said selected discharges by causing adjacently corresponding intersecting regions of said first shift electrodes to discharge;

(c) applying second and subsequent sequentially shifting voltage pulses to second and subsequent shift electrodes of said set of parallel shift electrodes immediately adjacent said second and subsequent electrodes respectively, to thereby effect lateral shifting of said selected discharges;

(d) halting lateral shifting of said selected discharges when said discharges are at a desired display location;

(e) applying display voltage pulses at a predetermined rate to at least two adjacent electrodes in alternate fashion at said desired display location, to thereby effect limited shifting of said selected discharges in oscillating fashion between said at least two adjacent electrodes and causing said shifted selected discharges at said desired location to be displayed at said at least two adjacent electrodes; and (f) sequentially applying erase pulses for erasing a wall charge generated by said selected discharges following said shifting and display voltage pulses being applied and said selected discharge being shifted to an adjacent electrode.

2. A method for driving a gas discharge display panel in claim 1, wherein said shifting voltage pulses and said display voltage pulses are of the same amplitude.

3. A method of driving a gas discharge display panel having electrodes which define an array of discharge points operating to display information addressed into said panel at selected ones of said discharge points by shifting said selected discharge points along said array during a shift operation and display-holding said selected discharge points during a display operation comprising the steps of:

(a) applying sequentially gated shift voltage pulses to sequentially arranged electrodes of said gas discharge display panel to effect the lateral shifting of said selected discharge points along said array during said shift operation;

(b) stopping said shift operation period when said selected discharge points reach a desired electrode location on said array; and (c) applying display voltage pulses at a uniform predetermined rate alternatively to the electrode at said desired electrode location and to at least one electrode immediately adjacent said desired electrode location to thereby cause said information to be displayed by oscillating said selected discharge points between said at least one immediately adjacent electrode of said array, whereby to maintain an equal operation margin for both the shift operation period and the display operation period.

4. A method of driving a gas discharge display panel as in claim 3, wherein said shift voltage pulses and said display voltage pulses are equal in amplitude and are applied for the same gated period and equal sequence to the adjacent electrode for the corresponding shift operation period and the display operation period.

5. A gas discharge display apparatus comprising:

a first base plate including a set of parallel common electrodes disposed thereon, each of said parallel common electrodes being arranged along a respective predetermined shift line;

a second base plate including a set of parallel shift electrodes disposed thereon, said set of parallel common electrodes being oriented to respectively traverse in intersecting fashion the set of parallel shift electrodes to define a discharge region at each of the traversing intersections;

a set of write electrodes disposed on one of said first and second base plates to define a write discharge region at one end of each respective predetermined shift line;

means for addressing selected ones of said set of write electrodes with a write voltage producing discharges at corresponding selected write discharge regions;

means for sequentially applying shifting voltage pulses to a first and subsequent electrodes of said set of parallel shift electrodes immediately adjacent said selected write discharge regions thereby effecting a lateral shifting of said selected discharges by causing adjacently corresponding intersecting regions of said first and subsequent shift electrodes to respectively discharge;

means for halting lateral shifting of said selected discharges when said discharges are at a desired display location; and means for applying display voltage pulses at a predetermined uniform rate to at least two adjacent shift electrodes in alternate fashion at said desired display location to thereby effect limited shifting of said selected discharges in oscillating fashion between said at least two adjacent shift electrodes.

6. A gas discharge display panel as in claim 5, wherein said means for applying shifting voltage pulses and means for applying said display voltage pulses generate pulses of equal amplitude and further comprise means for controlling the applying sequence of said pulses so as to maintain an equal operation margin for both the shift operation period and the display operation period.

* * * * *

UNITED STATES PATENT AND TRADEMARK OFFICE
CERTIFICATE OF CORRECTION

PATENT NO. : 4,114,069

DATED : September 12, 1978

INVENTOR(S) : Hisashi Yamaguchi et al

It is certified that error appears in the above-identified patent and that said Letters Patent are hereby corrected as shown below:

Column 3, line 2, "CL" (second occurrence) should be --$\overline{CL}$--.

Signed and Sealed this

***Twenty-eighth* Day of *November 1978***

[SEAL]

*Attest:*

RUTH C. MASON
*Attesting Officer*

DONALD W. BANNER
*Commissioner of Patents and Trademarks*